March 28, 1933.  C. C. WORTHINGTON  1,902,928
GANG LAWN MOWER
Filed July 29, 1931
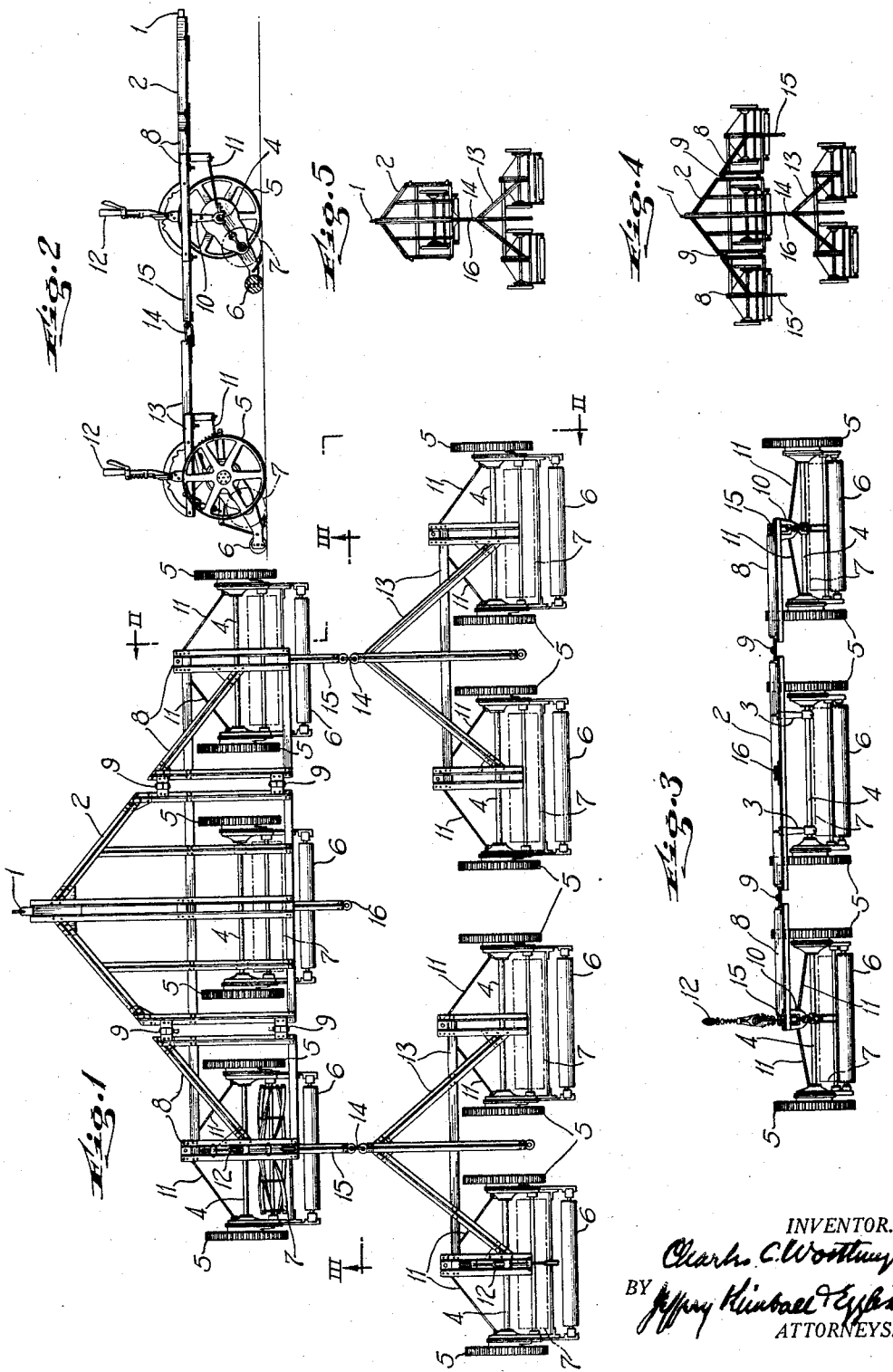
INVENTOR.
Charles C. Worthington
BY Jeffery Kimball Eggleston
ATTORNEYS.

Patented Mar. 28, 1933

1,902,928

UNITED STATES PATENT OFFICE

CHARLES C. WORTHINGTON, OF DUNFIELD, NEW JERSEY

GANG LAWN MOWER

Application filed July 29, 1931. Serial No. 553,709.

The object is the improvement of gang lawn mowers whereby they may be composed of seven or less lawn mower units with each unit properly tracking with the others under all conditions of ground undulations without leaving any uncut strips of grass between individual swaths and without side-skidding under any possible combination of ground undulation and direction of turning, the organization being such that while the gang cuts a very wide swath all of its units are included in two transverse rows, and also being such that the gang can be quickly converted to one of less number of units as required.

When a gang lawn mower is composed of many lawn mower units all in two rows, it is found in practice that due to its great width it often encounters complicated combinations of ground slopes and surface elevations which do not occur, or not to the same extent, within the spread of smaller gangs. If when such wider, two row, gang is engaged on irregularities of lawn surface of the kind referred to, it also happens to be turning sharply to right or left, side-slipping and consequent marking of the turf is likely to result. The present invention avoids such accidents in machines of this class and, at the same time provides an organization of units and frame sections which is readily convertible into a practical gang of less number of units and narrower aggregate swath, being in fact convertible into a gang of any odd number of units from 3 to 7, and in every case with the units maintained in proper overlapping position, under all conditions.

To the ends indicated, the invention consists in a new organization of parts according to the principles exemplified in the accompanying drawing, which illustrates one embodiment of the invention, though not its only embodiment, as will presently become apparent. In this drawing—

Figure 1 is a top plan of a seven unit gang;

Figure 2, a side elevation, partly in section;

Figure 3, a rear elevation on line III—III;

Figure 4 represents the same machine, in plan, converted to a five unit gang, and Figure 5 to a three unit gang.

The apparatus is intended to be drawn by a small sized tractor, not shown, flexibly hooked by a proper draw bar connector 1 to the center frame section of the frame for the front row of units. This center or main draft section marked 2 is composed of angle bars or the like properly rigidly united in any suitable way, and superposed over the central unit of the front row and occupying a plane substantially coinciding with the tops of the units. Preferably this center frame section is directly supported upon the front unit, though this is not necessary if any other mode of support should be preferred. As shown, it is secured by two posts 3 directly to the axle or cross-rod 4 of the unit, Fig. 3. But this center front frame section 2 is located over its unit in any event, and the two posts 3 hold the unit, so that its axle 4 or the axis of its two ground wheels, is always square to the direction of travel, that is to say, the unit cannot turn sideways with reference to its frame section although the rear of the unit may swing up and down about the axis of the axle 4, relatively to the section.

It will be understood that the center front lawn mower unit, and all of the others are the conventional unit, commonly used in gang lawn mowers, each comprising a unit frame supported at its forward end by ground wheels 5, and at its rear end by a roller 6 and having a rotary cutter or fly knife 7, driven as usual by speed-multiplying gearing, not shown, but housed in the unit's frame.

To each side of the center frame section 2 there is horizontally hinged a side frame section 8, by means of a pair of strong hinges 9 the members of which are placed well apart, in the longitudinal direction, so as to provide an effective length of hinge axis suited to carry not only the draft of the terminal units in the front row, but of one or more units in the rear row, as presently described. Preferably, the effective length of this horizontal axis, i. e. the longitudinal separation of the front and rear hinges, is approximately equal to the width of the unit's fly knife 7. This length of axis is not merely to provide for the draft strain, which is heavy, but to insure that the side sections shall be perfectly free to rise and fall about their respective hinge axes, in accommodation to ground undulation without any tendency to bind or cramp or work hard because of such draft strain or load on them.

The two side frame sections 8 secured by such hinge means to the central section, are for controlling the position and propelling the terminal units of the front row, each being for that purpose superposed over its unit and preferably, though not necessarily, supported directly on or by it. It is connected to it in any event in such way that the unit can rock or tilt in the vertical plane of its own wheel axis relatively to said hinged frame section, but is always held square to the direction of travel of the gang, that is to say, its wheel axis is always in the same vertical plane, substantially, as the wheel axes of the other units in the same row. The specific connecting means for this purpose may be the same as illustrated in Pat. No. 1,607,378 and is indicated sufficiently in the present drawing by the center post 10 resting on the center of the unit axle 4 and the two pull links 11 which hold the unit square but permit it to tilt as stated.

All three of the front units have means for lifting the cutter mechanism more or less off the ground in order to vary the height of the cut. Such means is represented by the hand lever 12 appearing at the left of Fig. 1. There is intended to be one such control lever for each unit but because it is of well-known design and function, it has been omitted from all but the lefthand terminal units of each row. This lever also controls the tension of a spring (not shown) for urging the rear end of the unit frame toward the ground.

The units of the rear row, and in any event the unit at each end of that row, are assembled into the gang by connection directly to the horizontally hinged sections 8 so that the draw bar pull of connector 1 is transmitted first to the front center section, then to the two hinged side sections and thence to said rear terminal units, or to all of the rear units as the case may be. The draft connection of the rear units is by means which permit each unit to assume any necessary angular relation to the hinged section, either about a vertical or horizontal axis. It will be understood that the section 8 when at work on irregular ground, is constantly swinging up and down on its horizontal hinge axis, and the connection which the rear unit has to such section must be such as will accommodate that movement without itself being interfered with by such irregular action. For this purpose it is sufficient to provide the rear unit with a short draft frame having an ordinary hook or clevis coupling to the hinged front section. Preferably however each such rear draft frame section is made to hold and haul two adjacent rear units, since it is found that the hinged front sections are capable of this load and the action is better. Accordingly, each pair of rear units is assembled in a single rear frame section 13 coupled to a central point of the hinged front section by a hook or clevis 14, making a flexible joint of the kind required. Each of these rear units, in the draft section 13, is connected to such section by means identical with that by which the terminal units of the front row are connected to their horizontally hinged sections 8, that is to say, by means of center posts 10 and pull links 11, so that each is thereby held with its axis always maintained in the same vertical transverse plane as its companion unit, but with perfect freedom to tilt or rock in that plane according as ground undulation requires. It will be seen that one such twin unit frame 13, is connected to be drawn by each of the two front hinged sections 8, thus making a row of four units for the rear row, each in proper overlapping relation to the front units, or seven in all. The flexible draft connection, 14, between the rear unit frames and the hinged frame sections 8 is located somewhat to the rear of the front unit and approximately midway between the two rows of ground wheels, being for this purpose applied at the end of rearward tail piece 15 on the hinged section 8.

The front central frame section 2 is provided with a rear draft connection or tail piece 16, extending rearwards therefrom equally to the tail pieces 15. When it is desired to convert the seven unit gang, just described, to a five unit gang, one of the twin-unit frames is unhooked from its hinged side section and the other one is transferred from its hinged side section to this middle coupling member 16 as shown in Figure 4. Thereby a proper five-unit gang is produced. If now further reduction is desired, the two hinged side sections 8 may be removed from the front row, by opening the hinges 9, thus making it a three-unit gang, as indicated in Fig. 5. For this purpose, said hinge members are made readily disconnectible in any suitable way so that the conversion can be quickly made.

I claim:

1. A gang lawn mower comprising a center front frame section, a side section horizontally hinged to each side thereof, lawn mower units respectively connected to each of said sections by means holding their several wheel-axes to a common vertical transverse plane, a tail piece on each hinged section and a rear row unit flexibly coupled to said tail piece.

2. A gang lawn mower comprising a front row of three lawn mower units and a rear row of four units, a frame for the front row, means connecting the units of said front row to said frame adapted to hold them square to the direction of gang travel, said frame comprising a central front section provided with a drawbar connector, and two side sections longitudinally hinged to each side of said central section, means connecting the units to said side sections adapted to permit tilting thereof in the vertical planes of their ground wheel axes, relatively to said hinged sections, rearwardly extended draft coupling means on said hinged sections, a rear frame section, flexibly connected to each said coupling means, and rear lawn mower units connected to each said rear frame section.

3. A gang lawn mower comprising front and rear rows of lawn mower units having cutters driven by their respective ground wheels, a center frame section for the middle front unit, having a main drawbar coupler thereon and two side sections hinged thereto on longitudinal axes, each of the end units of the front row being connected to each of said hinged sections by means holding it square to the direction of gang travel but permitting the unit to tilt in the vertical plane of its wheel axis, relatively to its hinged section, a flexible coupler device on each of said hinged sections and extended rearward therefrom to positions about midway between the front and rear ground wheels, a rear frame section drawn by each of said coupler devices and two rear row units held in said rear frame section.

4. A convertible five- or seven-unit gang lawn mower, comprising front and rear rows of lawn mower units, a frame for the front row composed of a main center section and two side sections horizontally hinged thereto, a main draw-bar connector for said main section, a flexible draft coupling member on each of said side hinged sections, a central draft coupling member located on said center section and a rear frame section provided with two units flexibly mounted therein connectible indifferently to any of said three draft coupling members thereby rendering said gang lawn mower convertible.

5. A convertible five- or seven-unit gang lawn mower, comprising front and rear rows of lawn mower units, a frame for the front row composed of a main center section and two side sections horizontally hinged thereto, a flexible draft coupling member on each of said three sections, and a rear frame section connectible indifferently with any of said three flexible coupling members, each of said coupling members having its point of pivotal connection located about midway between the lines of the front and rear ground wheels of the lawn mower units.

In testimony whereof, I have signed this specification.

CHARLES C. WORTHINGTON.